United States Patent [19]
Rhee et al.

[11] 3,735,479
[45] May 29, 1973

[54] METHOD OF FUSION-BONDING PARTS BY PARTIAL LIQUID PHASE FORMATION

[75] Inventors: Seong K. Rhee, Livonia; Robert S. Kiwak, Dearborn Heights, both of Mich.

[73] Assignee: The Bendix Corporation, Southfield, Mich.

[22] Filed: Nov. 27, 1970

[21] Appl. No.: 93,330

[52] U.S. Cl............................29/498, 29/486, 29/DIG. 2
[51] Int. Cl............................B23k 3/02, B23k 35/24
[58] Field of Search............................29/498, 486

[56] References Cited
UNITED STATES PATENTS

| 3,083,452 | 4/1963 | Terrill et al. | 29/486 X |
| 3,581,382 | 6/1971 | Wells et al. | 29/498 |
| 3,392,442 | 7/1968 | Napier et al. | 29/498 X |
| 3,470,605 | 10/1969 | Benteler et al. | 29/498 |
| 3,504,428 | 4/1970 | Walter et al. | 29/498 X |

OTHER PUBLICATIONS

Hauser et al., "Solid–State Welding of Aluminum," Welding Journal Research Supplement, pp. 11-S to 22-S, Jan., 1967.
Welding Kaiser Aluminum 1st Edition, pp. 11-6 to 11-8, copyright 1967.

*Primary Examiner*—J. Spencer Overholser
*Assistant Examiner*—Ronald J. Shore
*Attorney*—John R. Benefiel and Plante, Hartz, Smith & Thompson

[57] ABSTRACT

A method of fusion bonding parts which are of material comprised of two or more components such as aluminum-magnesium alloys so that the material experiences a "freezing range" as it is heated from its solid state to its liquid state. The method includes heating the assembled parts just into the freezing range so that they remain substantially unaltered in shape and size, while the small amount of liquid formed creates a rapid fusion of the parts so that the parts are fusion bonded together upon cooling of the assembly.

1 Claim, 2 Drawing Figures

INVENTORS
SEONG K. RHEE
ROBERT S. KIWAK

BY John R. Benefiel
ATTORNEY

METHOD OF FUSION-BONDING PARTS BY PARTIAL LIQUID PHASE FORMATION

BACKGROUND OF THE INVENTION (1) Field of the Invention

This invention concerns a method of joining parts, and more particularly a method of joining by partial fusion of the part base material.

(2) Description of the Prior Art

Joining of metal parts by fusion has usually involved conventional welding, in which the adjoining surfaces are liquified by the direct application of heat perhaps with additional welding material added so that upon cooling the parts would become integral with each other, in the manner well known in the art.

In some applications, however, this approach has rather substantial disadvantages: In assembling laminates and other assemblies composed of thin individual sheet elements, the application of a welding heat would tend to destroy or grossly distort the individual element unless the weld were confined to localized areas, i.e., spot welding, which precludes a complete fusing of the parts at the interface. In addition, the total liquification of the material at the interface entirely destroys the mechanical strength of the part material so that difficulties in holding the preciseness of the assembled device are usually encountered, while flow of the liquid phase material from passage boundaries into the passage openings would substantially alter their configuration.

Fabrication of fluidic elements by stacking thin elements with flow passages etched or otherwise formed therein as an example of an application where these disadvantages are marked; and hence an alternate fusion technique has been utilized, i.e., diffusion bonding. In this process, the parts are clamped together and heated over a period of time, during which interval migration of the atoms across the interface slowly fuses the parts together. This method requires precise matching of the interface surfaces, heavy clamping pressures, and long time periods to effect properly and hence is a relatively expensive fabrication technique. For this reason, it has been the practice to insert by plating or some other method a thin layer of lower melting or eutectic-forming metal at the interface, which is then melted during the heating treatment to provide better matching of the surfaces and ultimately enhanced interdiffusion of the atoms.

This approach tends to create undesirable composition changes at the interface in the base material used, since the material used becomes diffused or dissolved thereinto.

Therefore, it is an object of the present invention to provide a method of fusion bonding which does not require precise matching of the part surfaces, does not result in compositional changes of the base material at the interface, does not require long periods of time and/or heavy clamping pressures to effect, and which may be utilized in precision fabrication operations.

SUMMARY OF THE INVENTION

This object and others which will become apparent upon a reading of the following specification and claims is accomplished by heating the parts so that only partial liquifying occurs, i.e., heating just into the freezing range of the part material (that is, slightly above the solidus line), so that the structural shape and size of the part are unaffected, but the small amount of liquid phase material insures rapid and complete fusion at the interface without compositional changes in the base material. BRIEF DESCRIPTION OF THE DRAWING FIG. 1 is a simplified phase diagram of a typical two-component material, together with a notation indicating the ranges within which the process of the present invention is carried out.

FIG. 2 is a flow sheet depicting the process of the present invention.

DETAILED DESCRIPTION OF THE PREFERRED EMBODIMENT

In the following detailed description, certain specific terminology will be used and a specific embodiment will be described in order to provide a full and complete understanding of the invention, but it is to be understood that the invention is not to be so limited, as many variations are possible without departing from the spirit of the present invention.

Figure 1:
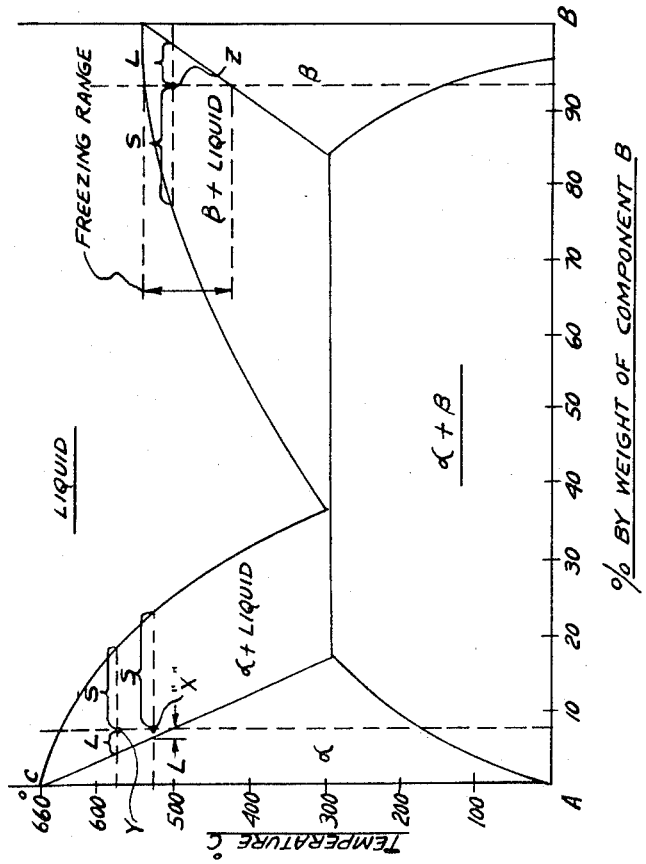

Referring to the drawing and particularly FIG. 1, a phase diagram for a typical two-component material is depicted. This diagram is a simplified representation of typical metal alloys such as aluminum-magnesium, lead-tin, etc., and represents the various states taken by a material at various temperatures for various proportions of components A and B.

In the range of compositions and temperatures represented by the region $\alpha$, the material is in the solid state and assumes a crystaline form of component A, i.e., the percentage of component B present is dissolved in the crystals of component A and no crystals $\beta$ of component B are present. In the range of compositions and temperatures represented by the region $\alpha$+ LIQUID, solid crystals of $\alpha$ with dissolved B molecules are present along with a varying proportion of a liquid mixture of molten A and B as will herein be described in greater detail.

In the range of temperatures and compositions represented by the region labelled $\alpha+\beta$, the material is entirely in the solid state and is made up of both $\alpha$ and $\beta$ crystals with dissolved B and A atoms, respectively.

In the range of temperatures and compositions represented by the region $\beta$, the material is entirely in the solid state and is comprised wholly of a crystal form $\beta$ of component B, and A component atoms present dissolved in the $\beta$ crystal structure.

In the range of compositions represented by the region $\beta$+ LIQUID, solid $\beta$ crystals are present along with a varying proportion of a liquid composed of a mixture of molten A and B.

It is noted that at only three points, i.e., the points represented by pure A and pure B and the eutectic point will the material pass directly from the "solidus" region into the "liquidus" region. That is, for all other proportions of A and B, a "freezing range" exists in which liquid and solid state material may coexist over a range of temperatures.

This is illustrated by the broken line extending vertically from the approximately 8 percent B point on the 0/0 by weight axis of the diagram. At all temperatures above the line forming the upper boundary of the $\alpha$ region (solidus) and below the line forming the upper boundary of the $\alpha$+ LIQUID region (liquidus) both liquid and solid $\alpha$ crystals coexist thus defining a freezing range. The proportion at any point therebetween may readily be determined by application of the well known "lever rule." As an example, at point X corresponding to a material temperature of 500°C, the relative proportions of solid and liquid in the total are the same as the relative proportion of the lengths of the lines S and L to the total length of the S + L defined by the intersection of the 500°C isotherm with the two phase boundaries defining the freezing range.

As can be seen by the shift in the proportion at point Y, the proportion of solid and liquid shifts with increasing temperatures until the mixture enters the liquid region and becomes totally liquid phase of A + B.

This same condition is noted at point Z in the β+ LIQUID region, only the solid phase present is in the form of B crystals with dissolved A atoms.

The same effect would also be evident above the α+β region, except that the solid phase would go from a mixture of α and β crystals into a region where a mixture of liquid and α or β crystals are present.

It should be understood that for the simplicity of explanation, a binary system has been used, but the same principle applies to multi-component systems.

It has been found that in the lower portions of the freezing range the solid crystals and the small amount of liquid present act in a similar manner as grains of sand and water, i.e., the surface tension of the liquid acting on the individual crystals or grains yields a cohesive force which is adequate to prevent significant deformation of the parts under the influence of their own weight.

This effect is relied on according to the present invention to create a fusion bond without the disadvantages of the prior art techniques described infra, by heating the parts just into the freezing range of the particular composition so that a small amount of liquid is present, but that the structural integrity and configuration of the parts remain unaffected. The small amount of liquid acts to fill the small part surface irregularities at the interface and promotes rapid interdiffusion of the mating part surfaces.

Preferably, alloys or mixtures in which the freezing range is relatively large should be utilized so that the phase condition of the parts may be controlled with relative ease since temperatures then need not be controlled with great precision.

Figure 2:
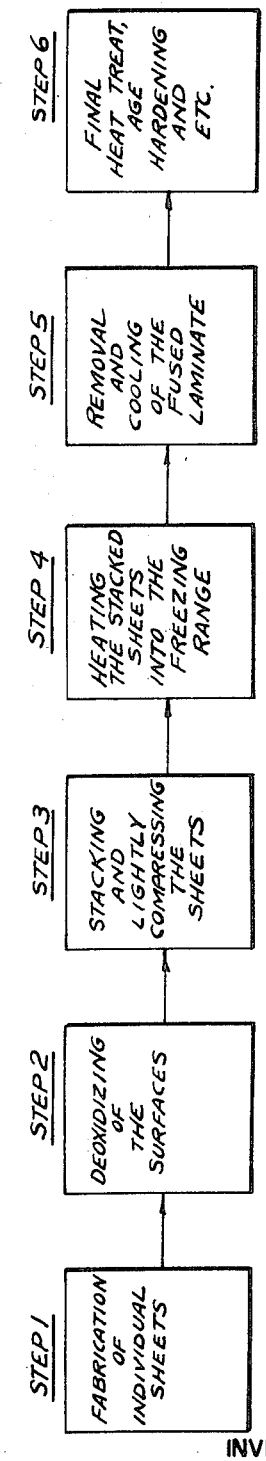

Referring to FIG. 2, a flow diagram depicts a typical process for fusion bonding of thin metal sheets into a laminate, as for fabrication of fluidic elements.

In Step I, the individual sheets are fabricated, while in Step II the interface surfaces are deoxidized since surface oxides will tend to form occlusions at the interface and prevent fusion of the base material.

In Step III, the sheets are stacked in a vacuum furnace, using only enough clamping or holding pressure to insure accurate registry of the sheet openings and contact of the interfaces, and in Step IV, the critical heating of the stacked sheets into the freezing range of the particular part composition phase state is carried out during which the actual fusing process occurs. Steps V and VI involve cooling the completed laminate and final heat treat and/or age hardening if required.

A specific example is here described which has actually been successfully carried out in fabrication of fluidic devices of 2024 aluminum alloy parts:

Step 1: Clean parts in sodium hydroxide or other cleaning solution.
Step 2: Rinse in water.
Step 3: Rinse in a nitric acid solution (10 percent) vy volume).
Step 4: Rinse in water.
Step 5: Rinse in alcohol.
Step 6: Assembly and place in a vacuum furnace.
Step 7: Join at 980°F at a vacuum of less than $10^{-4}$ Torr for a period of 10 minutes.

The vacuum is necessary to prevent reformation of surface oxides during the heating operation.

Obviously, the joining can be performed in a neutral or reducing atmosphere too. Similarly to 2024 aluminum alloy, 5052 aluminum alloy was successfully bonded at 1120°F.

As can be appreciated by the above description, this fusion process can be carried out much more rapidly and simply than conventional diffusion bonding processes, does not destroy the precision configuration of the parts as in welding processes, and does not create compositional changes at the interface nor require extra plating steps as are involved in diffusion bonding with an intermediate low melting plating or insert material.

It should be noted that the extent into the freezing range that the parts are heated depends on the material used, as the density, viscosity, and surface tension of the liquid phase, grains sizes, etc., will control the extent to which the parts will hold together at any given state of liquid and solid mixture, while the amount of liquid necessary to insure rapid fusion will also depend on these factors plus the relative mismatch of the mating surfaces. Hence, the proper proportion of liquid and solid phase present during fusion must be determined for each material and part application, but generally will lie in the lowest part of the freezing range, i.e., from 0.01 to 25 percent by weight of liquid present.

In connection with this, it is noted that compositions which exhibit a relatively wide freezing range are preferable, inasmuch as control of the amount of liquid present would be thereby much facilited, as noted above.

The time required for complete fusion is relatively rapid in comparison with conventional diffusion bonding techniques and will occur within a few minutes, although the precise time required will vary with the material, the proportion of liquid phase present but can be determined readily by experiment for any given application.

While a specific example has been given, it should be apparent the invention is in no way limited thereto as many materials and procedures appropriate thereto may utilize this process.

We claim:
1. A process for bonding sheet members of an aluminum alloy composition having a freezing range into a laminate comprising:
stacking said sheet members with the interfacing surfaces formed of said aluminum alloy in contact;
heating said sheet members partially into said freezing range temperature whereat 0.01 – 25 percent by weight of liquid phase material is present and maintaining said temperature until fusion of said sheet members occurs.

* * * * *